(12) United States Patent
Putz et al.

(10) Patent No.: US 7,779,877 B2
(45) Date of Patent: Aug. 24, 2010

(54) TAKE APART VEHICLE WHEEL ASSEMBLY

(75) Inventors: Chris Putz, Canton, MI (US); Dave Hengstebeck, Novi, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 91 days.

(21) Appl. No.: 12/154,705

(22) Filed: May 27, 2008

(65) Prior Publication Data

US 2009/0295218 A1 Dec. 3, 2009

(51) Int. Cl.
*B60B 23/06* (2006.01)
*B60B 25/04* (2006.01)

(52) U.S. Cl. .............. 152/405; 152/396; 152/402; 301/11.1; 301/95.11

(58) Field of Classification Search ........... 301/10.1, 301/11.1, 95.101, 11.2, 35.631, 95.11; 152/396, 152/397, 398, 402, 405; D12/204, 208
See application file for complete search history.

(56) References Cited

U.S. PATENT DOCUMENTS

| | | | | |
|---|---|---|---|---|
| 3,529,869 | A * | 9/1970 | Casey | 301/11.1 |
| 4,643,484 | A * | 2/1987 | Luter et al. | 301/11.3 |
| 4,823,854 | A | 4/1989 | Payne et al. | |
| 4,836,261 | A | 6/1989 | Weeks et al. | |
| 5,022,450 | A * | 6/1991 | Weeks | 152/381.6 |
| 5,215,137 | A | 6/1993 | Weeks et al. | |
| 5,380,071 | A * | 1/1995 | Kier, Jr. | 301/63.101 |
| 5,533,260 | A | 7/1996 | Kier, Jr. | |
| 6,027,176 | A * | 2/2000 | Kuhl et al. | 301/11.1 |
| 6,315,366 | B1 | 11/2001 | Post et al. | |
| 7,228,629 | B2 * | 6/2007 | Beyer | 29/894.35 |

OTHER PUBLICATIONS

International Search Report for International Application No. PCT/US2009/045103 completed Dec. 28, 2009.

* cited by examiner

*Primary Examiner*—Russell D Stormer
(74) *Attorney, Agent, or Firm*—MacMillan, Sobanski & Todd, LLC

(57) ABSTRACT

A take apart vehicle wheel assembly includes at least a first, a second and a third wheel part operatively connected together to form the take apart vehicle wheel assembly. A first one of the first, second and third wheel parts is provided with a plurality of first stud receiving holes spaced circumferentially therearound in a first unevenly spaced circumferential pattern such that each of the first stud receiving holes is spaced apart from a next adjacent first stud receiving hole by a different angular spacing. A second one of the first, second and third wheel parts is provided with a plurality of second stud receiving holes spaced circumferentially therearound in unevenly spaced circumferential pattern which corresponds to the first unevenly spaced circumferential pattern of the first stud receiving holes to enable stud bolts and nuts to be used to releasably connect the first one and the second one of the first, second and third wheel parts together.

9 Claims, 11 Drawing Sheets

TAKE APART VEHICLE WHEEL ASSEMBLY

BACKGROUND OF THE INVENTION

This invention relates in general to vehicle wheel assemblies and in particular to an improved take apart vehicle wheel assembly.

U.S. Pat. No. 6,315,366 to Post et al. discloses a prior art take apart vehicle wheel assembly. As shown in FIG. 1 of the Post et al. patent, the prior art take apart vehicle wheel assembly includes an inner rim, an outer rim-clamp ring, and a wheel mounting disc. The wheel mounting disc is welded to the inner rim, and threaded stud bolts extend through apertures formed through the wheel mounting disc and the outer rim-clamp ring. Nuts are installed on and tightened on the stud bolts to secure the wheel mounting disc, and therefore the inner rim, to the outer rim-clamp.

As further shown in FIG. 1 of the Post et al. patent, cooperating surfaces of the inner rim, the outer rim-clamp ring, and the wheel mounting disc define a generally triangular shaped cavity. An elastomeric seal is disposed in the triangular shaped cavity and is compressed between the opposing surfaces of the respective components of the wheel assembly to prevent air leakage. When the nuts on the threaded stud bolts are loosened, air leakage past the elastomeric seal occurs prior to the nuts being removed from the studs.

SUMMARY OF THE INVENTION

This invention relates to an improved take apart vehicle wheel assembly. The take apart vehicle wheel assembly comprises at least a first, a second and a third wheel part operatively connected together to form the take apart vehicle wheel assembly. A first one of the first, second and third wheel parts is provided with a plurality of first stud receiving holes spaced circumferentially therearound in a first unevenly spaced circumferential pattern such that each of the first stud receiving holes is spaced apart from a next adjacent first stud receiving hole by a different angular spacing. A second one of the first, second and third wheel parts is provided with a plurality of second stud receiving holes spaced circumferentially therearound in unevenly spaced circumferential pattern which corresponds to the first unevenly spaced circumferential pattern of the first stud receiving holes to enable stud bolts and nuts to be used to releasably connect the first one and the second one of the first, second and third wheel parts together.

According to one embodiment, the first stud receiving holes includes twelve tandem groupings of stud receiving holes and the second stud receiving holes includes twelve tandem groupings of stud receiving holes. The first and second stud receiving holes of each of the tandem groupings are spaced apart from each other by a first angle and adjacent ones of the first and second stud receiving holes of adjacent tandem groupings are spaced apart from each other by a second angle which is greater than the first angle.

According to another embodiment, the first stud receiving holes includes six tandem groupings of stud receiving holes and the second stud receiving holes includes six tandem groupings of stud receiving holes. The first and second stud receiving holes of each of the tandem groupings are spaced apart from each other by a first angle and adjacent ones of the first and second stud receiving holes of adjacent tandem groupings are spaced apart from each other by a second angle which is less than the first angle.

According to another embodiment, the first wheel part is an inner rim, the second wheel part is an outer rim-wheel mounting disc, and the third wheel part is a clamp ring. The first stud receiving holes are provided in the outer rim-wheel mounting disc and the second stud receiving holes are provided in the clamp ring.

According to another embodiment, the first wheel part is an inner rim, the second wheel part is a wheel mounting disc, and the third wheel part is an outer rim-clamp ring. The first stud receiving holes are provided in the outer rim-clamp ring and the second stud receiving holes are provided in the wheel mounting disc.

According to another embodiment, the take apart vehicle wheel assembly includes four wheel parts. The first wheel part is an inner rim, the second wheel part is an outer rim, the third wheel part is a wheel mounting disc, and the fourth wheel part is an outer clamp ring. First stud receiving holes are provided in the outer clamp ring and the second stud receiving holes are provided in the wheel mounting disc.

According to another embodiment, the take apart vehicle wheel assembly comprises a first wheel part which defines at least a portion of an inner rim of the take apart vehicle wheel assembly; a second wheel part joined to the first wheel part by a weld, the second wheel part provided with a plurality of first stud receiving holes formed therein; and a third wheel part at least operatively connected to the second wheel part by a plurality of stud bolts and nuts. The third wheel part is provided with a plurality of second stud receiving holes formed therein. The first stud receiving holes are spaced circumferentially around the second wheel part in a first unevenly spaced circumferential pattern such that each of the first stud receiving holes is spaced apart from a next adjacent first stud receiving hole by a different angular spacing. The second stud receiving holes are spaced circumferentially around the third wheel part in unevenly spaced circumferential pattern which corresponds to the first unevenly spaced circumferential pattern of the first stud receiving holes of the second wheel part to enable the stud bolts and nuts to be used to releasably connect the second wheel part and the third wheel part together.

Other advantages of this invention will become apparent to those skilled in the art from the following detailed description of the preferred embodiments, when read in light of the accompanying drawings.

DESCRIPTION OF THE PREFERRED EMBODIMENTS

Figure 1:
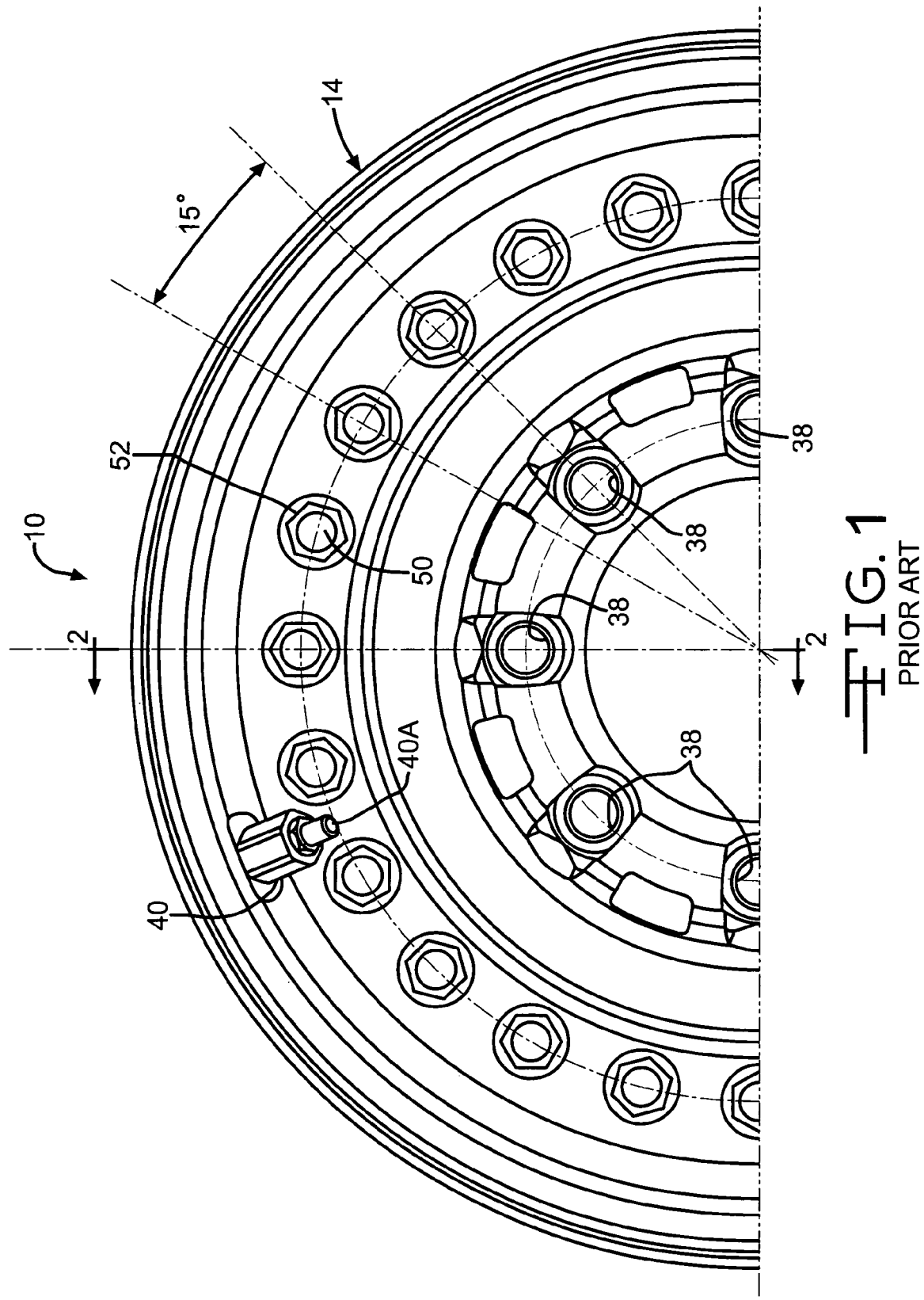
FIG. 1 is a plan view of a portion of a first embodiment of a prior art take apart vehicle wheel assembly.
Figure 2:
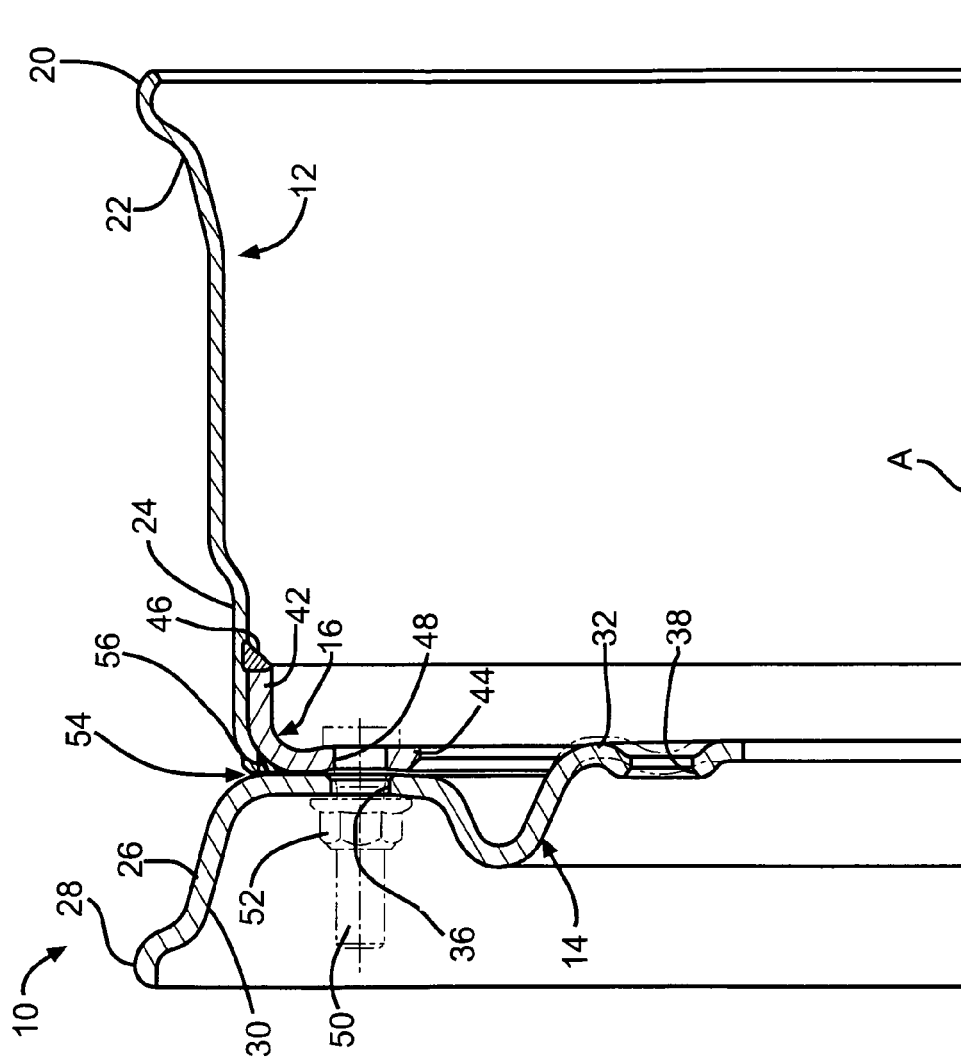
FIG. 2 is a sectional view of the prior art take apart vehicle wheel assembly taken along line 2-2 of FIG. 1.

Referring now to the drawings, there is illustrated in prior art FIGS. 1-2 a portion of a first embodiment of a prior art take apart vehicle wheel assembly, indicated generally at 10. The prior art take apart vehicle wheel assembly 10 includes an inner rim or first wheel part 12, a combination outer rim-wheel mounting disc or second wheel part 14, and a clamp ring or third wheel part 16. The inner rim 12 is fabricated from steel, aluminum, or other alloy materials and includes an inboard tire bead seat retaining flange 20, an inboard tire bead seat 22, and a generally axially extending well 24.

The outer rim-wheel mounting disc 14 is fabricated from steel, aluminum, magnesium, titanium, or other alloy materials and includes an outer annular flange 30, an inner mounting surface 32, and defines an axis A. The outer annular flange 30 of the outer rim-wheel mounting disc 14 defines an outboard tire bead seat 26 and an outboard tire bead seat retaining flange 28 of the wheel assembly 10.

The outer rim-wheel mounting disc 14 includes a plurality of stud receiving holes 36 formed therein. In particular, in the prior art vehicle wheel assembly 10, twenty-four stud receiving holes 36 are formed in the outer rim-wheel mounting disc 14. In the prior art take apart vehicle wheel assembly, the stud receiving holes 36 are evenly spaced circumferentially around the outer rim-wheel mounting disc 14 at fifteen degrees apart from one another.

The inner mounting surface 32 of the outer rim-wheel mounting disc 14 includes a plurality of wheel mounting stud receiving holes 38 formed therethrough. In particular, eight wheel mounting stud receiving holes 38 are formed in the inner mounting surface 32 (only five of such wheel mounting stud receiving holes 38 being shown in prior art FIG. 1). The wheel mounting stud receiving holes 38 are adapted to receive lug bolts and nuts (not shown) for securing the prior art take apart vehicle wheel assembly 10 on an axle (not shown) of a vehicle. A conventional inflation valve 40 (shown in FIG. 1), extends through and is mounted to the outer annular flange 30 of the outer rim-wheel mounting disc 14. The valve 40 has an associated valve insert 40A for inflation of the prior art take apart vehicle wheel assembly 10.

The clamp ring 16 is forged, cast, fabricated, or otherwise formed from steel, aluminum, magnesium, titanium, or other alloy materials. The clamp ring 16 includes a generally axially extending first portion 42 and a generally radially extending second portion 44. The first portion 42 defines an outer cylindrical surface which is connected to the well 24 of the inner rim 12 by a weld 46.

The second portion 44 is provided with a plurality of stud receiving holes 48 formed therein. The number and spacing of the stud receiving holes 48 provided in the second portion 44 of the clamp ring 16 corresponds to the number and spacing of the stud receiving holes 36 provided in the outer rim-wheel mounting disc 14. Thus, there are twenty four stud receiving holes 48 evenly spaced circumferentially around the second portion 44 at fifteen degrees apart from one another. The stud receiving holes 36 and 48 of the outer rim-wheel mounting disc 14 and the clamp ring 16, respectively, receive stud bolts 50 and nuts 52 (both shown in phantom), to secure the clamp ring 16, and therefore the inner rim 12, to the outer rim-wheel mounting disc 14.

When the prior art take apart vehicle wheel assembly 10 is assembled, a generally triangular shaped cavity, indicated generally at 54, is defined between adjacent surfaces of the inner rim 12, the outer rim-wheel mounting disc 14, and the clamp ring 16. As shown in FIG. 2, an elastomeric seal 56 is disposed in the cavity 54 for providing an air-tight seal between these adjacent surfaces when the nuts 52 are tightened on the bolts 50 so as to compress the seal 56 within the cavity 54. The construction and operation of the prior art take apart vehicle wheel assembly 10 thus far described in conventional in the art.

Figure 3:
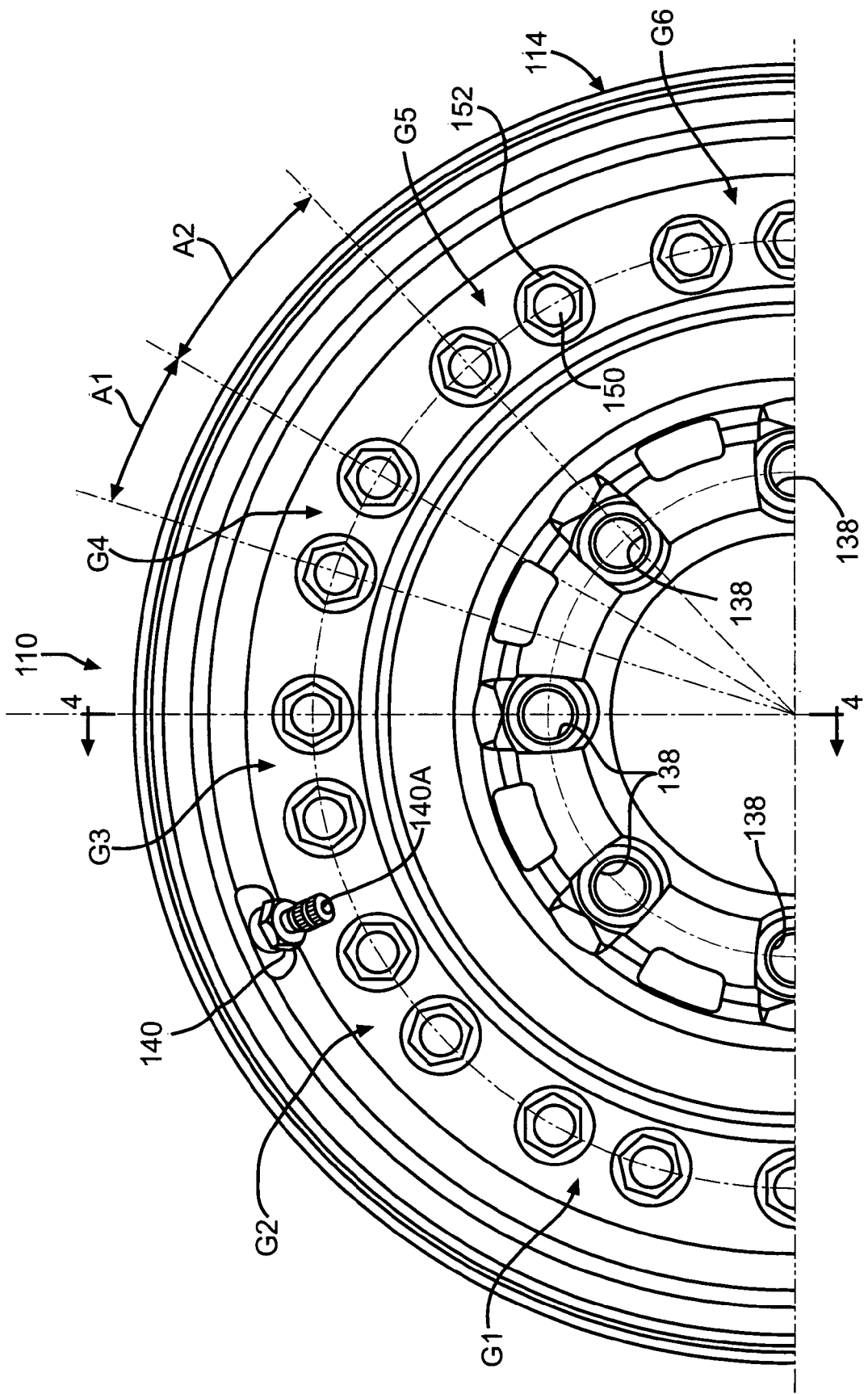
FIG. 3 is a plan view of a first embodiment of a take apart vehicle wheel assembly in accordance with this invention.
Figure 4:
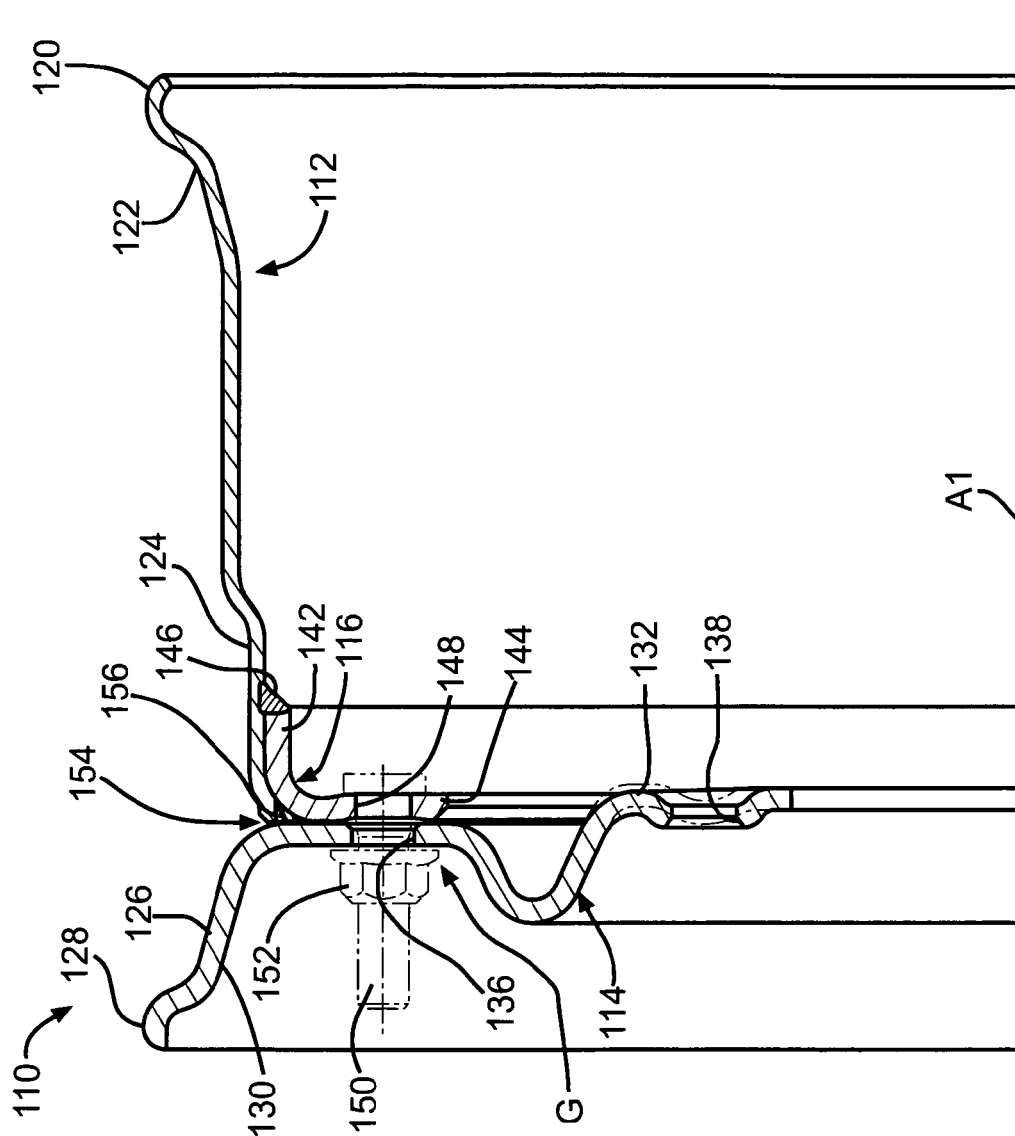
FIG. 4 is a sectional view of the first embodiment of the take apart vehicle wheel assembly taken along line 4-4 of FIG. 3.

Turning now to FIGS. 3-4, there is illustrated a first embodiment of a take apart vehicle wheel assembly, indicated generally at 110, in accordance with this invention. Although the following embodiments of the invention will be described and illustrated in conjunction with the particular take apart vehicle wheel constructions disclosed herein, it will be appreciated that the embodiments of the invention can be used in conjunction with other types of take apart vehicle wheel constructions. For example, the invention can be used in connection with other types of take apart vehicle wheel constructions, including three or more wheel component parts, such as for example as shown in U.S. Pat. No. 4,836,261 to Weeks et al. and U.S. Pat. No. 6,315,366 Post et al., the disclosures of each of these patents incorporated by reference in entirety herein.

As shown in FIGS. 3-4, the take apart vehicle wheel assembly 110 includes an inner rim or first wheel part 112, a combination outer rim-wheel mounting disc or second wheel part 114, and a clamp ring or third wheel part 116. The inner rim 112 is fabricated from steel, aluminum, or other alloy materials and includes an inboard tire bead seat retaining flange 120, an inboard tire bead seat 122, and a generally axially extending well 124.

The outer rim-wheel mounting disc 114 is fabricated from steel, aluminum, magnesium, titanium, or other alloy materials and includes an outer annular flange 130, an inner mounting surface 132, and defines an axis A1. The outer annular flange 130 of the outer rim-wheel mounting disc 114 defines an outboard tire bead seat 126 and an outboard tire bead seat retaining flange 128 of the wheel assembly 110. The outer rim-wheel mounting disc 114 includes a plurality of stud receiving holes 136 formed therein. In particular, in the vehicle wheel assembly 110, twenty-four stud receiving holes 136 are formed in the outer rim-wheel mounting disc 114.

In the illustrated embodiment, the stud receiving holes 136 are spaced circumferentially around the outer rim-wheel mounting disc 114 in a unique unevenly spaced circumferential pattern or arrangement (i.e., not the same spacing between each adjacent stud receiving hole 136), for a purpose to be discussed below. The circumferential pattern includes twelve pairs or tandem groupings of stud receiving holes 136, indicated generally at G in FIG. 4 (only six complete of such twelve tandem groupings G being illustrated in FIG. 3 and such six complete tandem groupings denoted by reference characters G1 to G6). In the illustrated embodiment, the stud receiving holes 136 of each tandem grouping G are preferably the same and are spaced apart from each other by a first angle A1 and adjacent stud receiving holes 136 of adjacent tandem groupings G are spaced apart from each other by a second angle A2.

In the illustrated embodiment, the angle A1 is preferably less than the angle A2. Preferably, the angle A1 is in the range from about ten degrees to about fourteen degrees and the angle A2 is in the range from about twenty degrees to about sixteen degrees. More preferably, as shown in the illustrated embodiment, the angle A1 is preferably approximately twelve and one-half degrees and the angle A2 is preferably approximately seventeen and one-half degrees. Alternatively, the spacing of the stud receiving holes 136 and associated tandem groupings G can be other than illustrated if so desired. For example, the spacing defined by the angle A1 between the stud receiving holes 136 of one or more of the twelve tandem groupings G can be different from that of another tandem grouping G and/or the spacing defined by the angle A2 between adjacent stud receiving holes 136 of adjacent tandem groupings G can be different from that of another adjacent tandem grouping G if so desired.

The inner mounting surface 132 of the outer rim-wheel mounting disc 114 includes a plurality of wheel mounting stud receiving holes 138 formed therethrough. In particular, eight wheel mounting stud receiving holes 138 are formed in the inner mounting surface 132. The wheel mounting stud receiving holes 138 are adapted to receive lug bolts and nuts (not shown) for securing the take apart vehicle wheel assembly 110 on an axle (not shown) of a vehicle. A conventional inflation valve 140 (shown in FIG. 3), extends through and is mounted to the outer annular flange 130 of the outer rim-wheel mounting disc 114 and has an associated valve insert 140A for inflation of the take apart vehicle wheel assembly 110. Alternatively, the number and/or spacing of the wheel mounting stud receiving holes 138 may be other than illustrated if so desired.

The clamp ring 116 is forged, cast, fabricated, or otherwise formed from steel, aluminum, magnesium, titanium, or other alloy materials. The clamp ring 116 includes a generally axially extending first portion 142 and a generally radially extending second portion 144. The first portion 142 defines an outer cylindrical surface which is connected to the well 124 of the inner rim 112 by a weld 146.

The second portion 144 is provided with a plurality of stud receiving holes 148 formed therein. The number and spacing of the stud receiving holes 148 provided in the second portion 144 of the clamp ring 116 corresponds to the number and spacing of the stud receiving holes 136 provided in the outer rim-wheel mounting disc 114. Thus, in the illustrated embodiment, there are twelve groupings of stud receiving holes 148 spaced in the same manner as that described above in connection with the stud receiving holes 136 of the outer rim-wheel mounting disc 114. The stud receiving holes 136 and 148 of the outer rim-wheel mounting disc 114 and the clamp ring 116, respectively, receive stud bolts 150 and nuts 152 (both shown in phantom), to secure the clamp ring 116, and therefore the inner rim 112, to the outer rim-wheel mounting disc 114.

Figure 5:
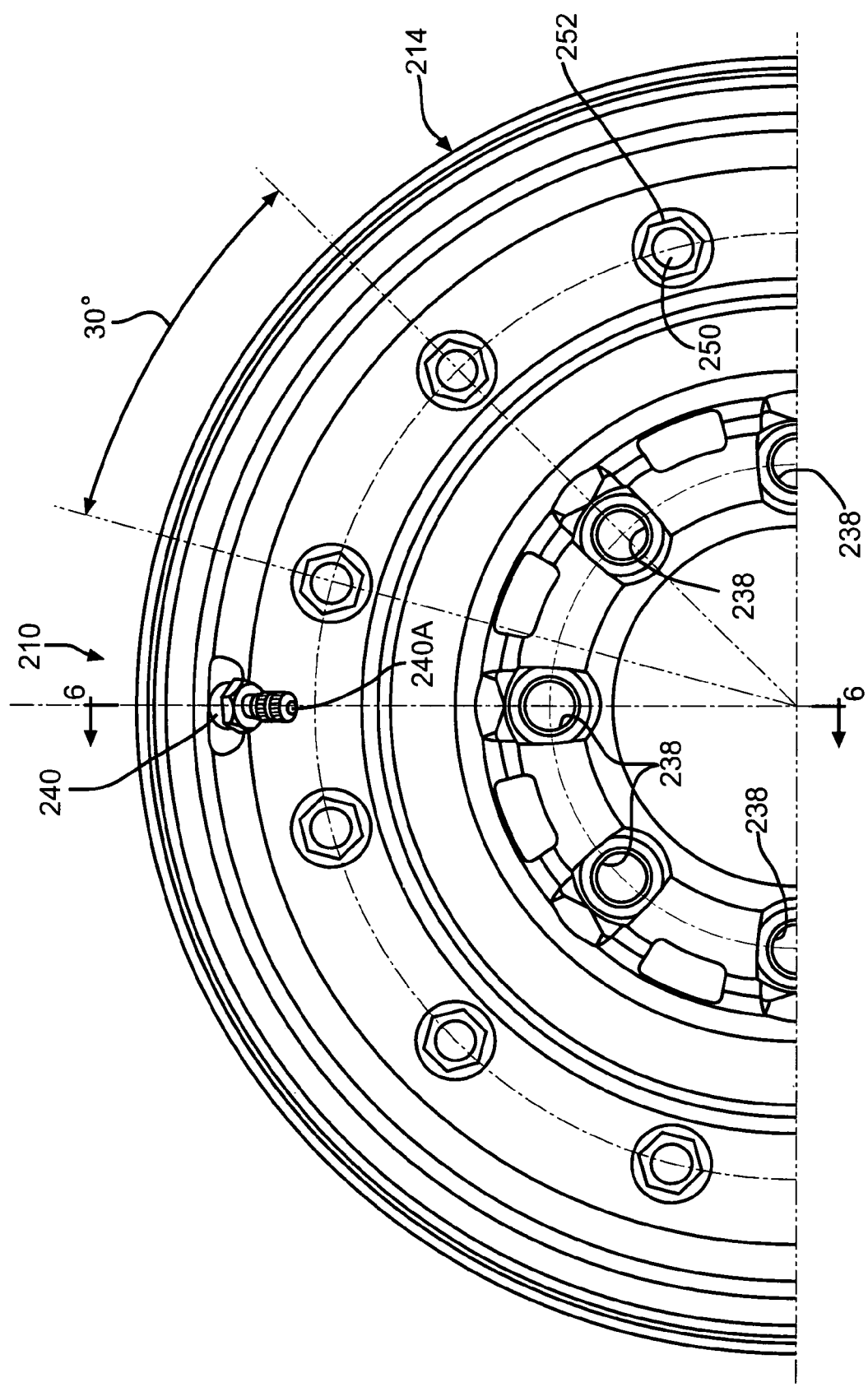
FIG. 5 is a plan view of a portion of a second embodiment of a prior art take apart vehicle wheel assembly.
Figure 6:
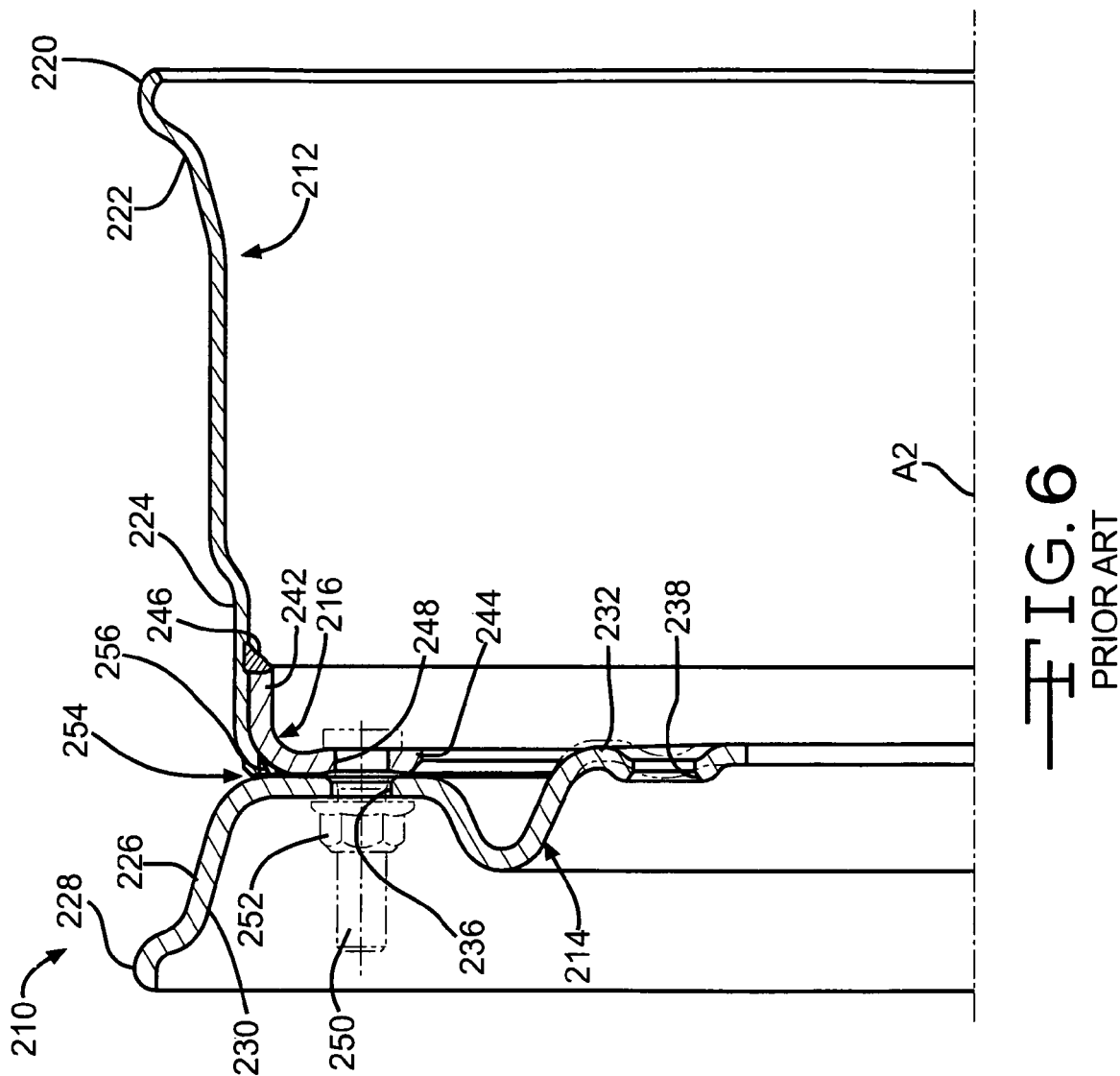
FIG. 6 is a sectional view of the prior art take apart vehicle wheel assembly taken along line 6-6 of FIG. 5.

Turning now to FIGS. 5-6, there is illustrated a portion of a second embodiment of a prior art take apart vehicle wheel assembly, indicated generally at 210. The prior art take apart vehicle wheel assembly 210 includes an inner rim or first wheel part 212, a combination outer rim-wheel mounting disc or second wheel part 214, and a clamp ring or third wheel part 216. The inner rim 212 is fabricated from steel, aluminum, or other alloy materials and includes an inboard tire bead seat retaining flange 220, an inboard tire bead seat 222, and a generally axially extending well 224.

The outer rim-wheel mounting disc 214 is fabricated from steel, aluminum, magnesium, titanium, or other alloy materials and includes an outer annular flange 230, an inner mounting surface 232, and defines an axis A2. The outer annular flange 230 of the outer rim-wheel mounting disc 214 defines an outboard tire bead seat 226 and an outboard tire bead seat retaining flange 228 of the wheel assembly 210.

The outer rim-wheel mounting disc 214 includes a plurality of stud receiving holes 236 formed therein. In particular, in the prior art vehicle wheel assembly 210, twelve stud receiving holes 236 are formed in the outer rim-wheel mounting disc 214. In the prior art take apart vehicle wheel assembly, the stud receiving holes 236 are evenly spaced circumferentially around the outer rim-wheel mounting disc 214 at thirty degrees apart from one another.

The inner mounting surface 232 of the outer rim-wheel mounting disc 214 includes a plurality of wheel mounting stud receiving holes 238 formed therethrough. In particular, eight wheel mounting stud receiving holes 238 are formed in the inner mounting surface 232 (only five of such wheel mounting stud receiving holes 238 being shown in prior art FIG. 5). The wheel mounting stud receiving holes 238 are adapted to receive lug bolts and nuts (not shown) for securing the prior art take apart vehicle wheel assembly 210 on an axle (not shown) of a vehicle. A conventional inflation valve 240 (shown in FIG. 5), extends through and is mounted to the outer annular flange 230 of the outer rim-wheel mounting disc 214. The valve 240 has an associated valve insert 240A for inflation of the prior art take apart vehicle wheel assembly 210.

The clamp ring 216 is forged, cast, fabricated, or otherwise formed from steel, aluminum, magnesium, titanium, or other alloy materials. The clamp ring 216 includes a generally axially extending first portion 242 and a generally radially extending second portion 244. The first portion 242 defines an outer cylindrical surface which is connected to the well 224 of the inner rim 212 by a weld 246.

The second portion 244 is provided with a plurality of stud receiving holes 248 formed therein. The number and spacing of the stud receiving holes 248 provided in the second portion 244 of the clamp ring 216 corresponds to the number and spacing of the stud receiving holes 236 provided in the outer rim-wheel mounting disc 214. Thus, there are twelve stud receiving holes 248 evenly spaced circumferentially around the second portion 244 at thirty degrees apart from one another. The stud receiving holes 236 and 248 of the outer rim-wheel mounting disc 214 and the clamp ring 216, respectively, receive stud bolts 250 and nuts 252 (both shown in phantom), to secure the clamp ring 216, and therefore the inner rim 212, to the outer rim-wheel mounting disc 214.

When the prior art take apart vehicle wheel assembly 210 is assembled, a generally triangular shaped cavity, indicated generally at 254, is defined between adjacent surfaces of the inner rim 212, the outer rim-wheel mounting disc 214, and the clamp ring 216. As shown in prior art FIG. 6, an elastomeric seal 256 is disposed in the cavity 254 for providing an air-tight seal between these adjacent surfaces when the nuts 252 are tightened on the bolts 250 so as to compress the seal 256 within the cavity 254. The construction and operation of the prior art take apart vehicle wheel assembly 210 thus far described in conventional in the art.

Figure 7:
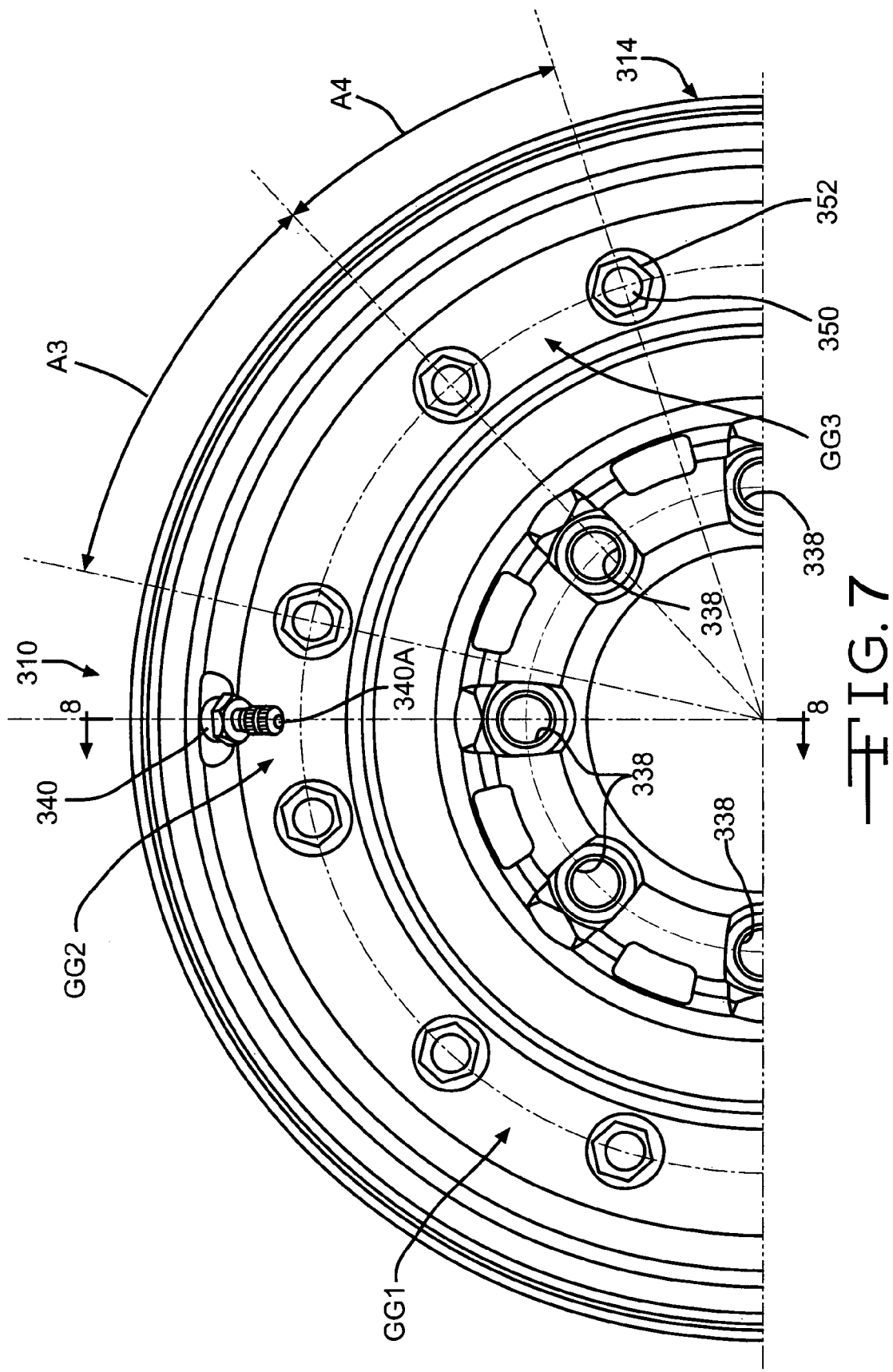
FIG. 7 is a plan view of a second embodiment of a take apart vehicle wheel assembly in accordance with this invention.
Figure 8:
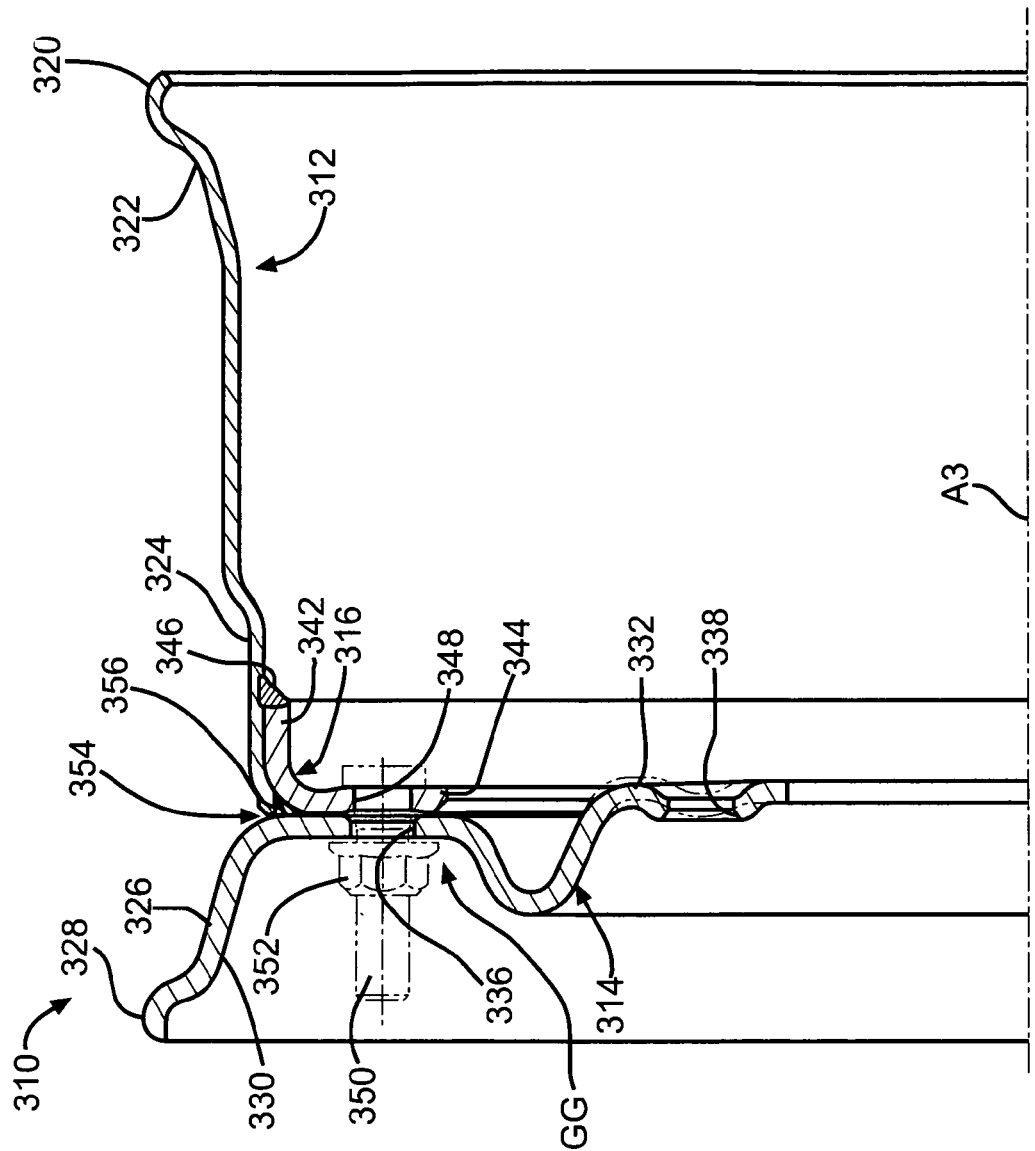
FIG. 8 is a sectional view of the second embodiment of the take apart vehicle wheel assembly taken along line 8-8 of FIG. 7.

Turning now to FIGS. 7-8, there is illustrated a second embodiment of a take apart vehicle wheel assembly, indicated generally at 310, in accordance with this invention. Although this invention will be described and illustrated in conjunction with the particular take apart vehicle wheel constructions disclosed herein, it will be appreciated that the invention can be used in conjunction with other types of take apart vehicle wheel constructions.

As shown in FIGS. 7-8, the take apart vehicle wheel assembly 310 includes an inner rim or first wheel part 312, a combination outer rim-wheel mounting disc or second wheel part 314, and a clamp ring or third wheel part 316. The inner rim 312 is fabricated from steel, aluminum, or other alloy materials and includes an inboard tire bead seat retaining flange 320, an inboard tire bead seat 322, and a generally axially extending well 324.

The outer rim-wheel mounting disc 314 is fabricated from steel, aluminum, magnesium, titanium, or other alloy materials and includes an outer annular flange 330, an inner mounting surface 332, and defines an axis A3. The outer annular flange 330 of the outer rim-wheel mounting disc 314 defines an outboard tire bead seat 326 and an outboard tire bead seat retaining flange 328 of the wheel assembly 310. The outer rim-wheel mounting disc 314 includes a plurality of stud receiving holes 336 formed therein. In particular, in the vehicle wheel assembly 310, twelve stud receiving holes 336 are formed in the outer rim-wheel mounting disc 314.

In the illustrated embodiment, the stud receiving holes 336 are spaced circumferentially around the outer rim-wheel mounting disc 314 in a unique unevenly spaced circumferential pattern or arrangement (i.e., not the same spacing between each adjacent stud receiving hole 336), for a purpose to be discussed below. The circumferential pattern includes six pairs or tandem groupings of stud receiving holes 336, indicated generally at GG in FIG. 8 (only three complete of such six tandem groupings GG being illustrated in FIG. 7 and such three complete tandem groupings denoted by reference characters GG1 to GG3). In the illustrated embodiment, the stud receiving holes 336 of each tandem grouping GG are preferably the same and are spaced apart from each other by a first angle A3 and adjacent stud receiving holes 336 of adjacent tandem groupings GG are spaced apart from each other by a second angle A4.

In the illustrated embodiment, the angle A4 is preferably less than the angle A3. Preferably, the angle A4 is in the range from about twenty degrees to about thirty degrees and the angle A3 is in the range from about thirty degrees to about forty degrees. More preferably, as shown in the illustrated embodiment, the angle A4 is preferably approximately twenty five degrees and the angle A3 is preferably approximately thirty five degrees. Alternatively, the spacing of the stud receiving holes 336 and associated tandem groupings GG can be other than illustrated if so desired. For example, the spacing defined by the angle A3 between the stud receiving holes 336 of one or more of the six tandem groupings GG can be different from that of another tandem grouping GG and/or the spacing defined by the angle A4 between adjacent stud receiving holes 336 of adjacent tandem groupings GG can be different from that of another adjacent tandem grouping GG if so desired.

The inner mounting surface 332 of the outer rim-wheel mounting disc 314 includes a plurality of wheel mounting stud receiving holes 338 formed therethrough. In particular, eight wheel mounting stud receiving holes 338 are formed in the inner mounting surface 332. The wheel mounting stud receiving holes 338 are adapted to receive lug bolts and nuts (not shown) for securing the take apart vehicle wheel assembly 310 on an axle (not shown) of a vehicle. A conventional inflation valve 340 extends through and is mounted to the outer annular flange 330 of the outer rim-wheel mounting disc 314 and has an associated valve insert 340A for inflation of the take apart vehicle wheel assembly 310. Alternatively, the number and/or spacing of the wheel mounting stud receiving holes 338 may be other than illustrated if so desired.

The clamp ring 316 is forged, cast, fabricated, or otherwise formed from steel, aluminum, magnesium, titanium, or other alloy materials. The clamp ring 316 includes a generally axially extending first portion 342 and a generally radially extending second portion 344. The first portion 342 defines an outer cylindrical surface which is connected to the well 324 of the inner rim 312 by a weld 346.

The second portion 344 is provided with a plurality of stud receiving holes 348 formed therein. The number and spacing of the stud receiving holes 348 provided in the second portion 344 of the clamp ring 316 corresponds to the number and spacing of the stud receiving holes 336 provided in the outer rim-wheel mounting disc 314. Thus, in the illustrated embodiment there are twelve groupings of stud receiving holes 348 spaced in the same manner as that described above in connection with the stud receiving holes 336 of the outer rim-wheel mounting disc 314. The stud receiving holes 336 and 348 of the outer rim-wheel mounting disc 314 and the clamp ring 316, respectively, receive stud bolts 350 and nuts 352 (both shown in phantom), to secure the clamp ring 316, and therefore the inner rim 312, to the outer rim-wheel mounting disc 314.

Figure 9:
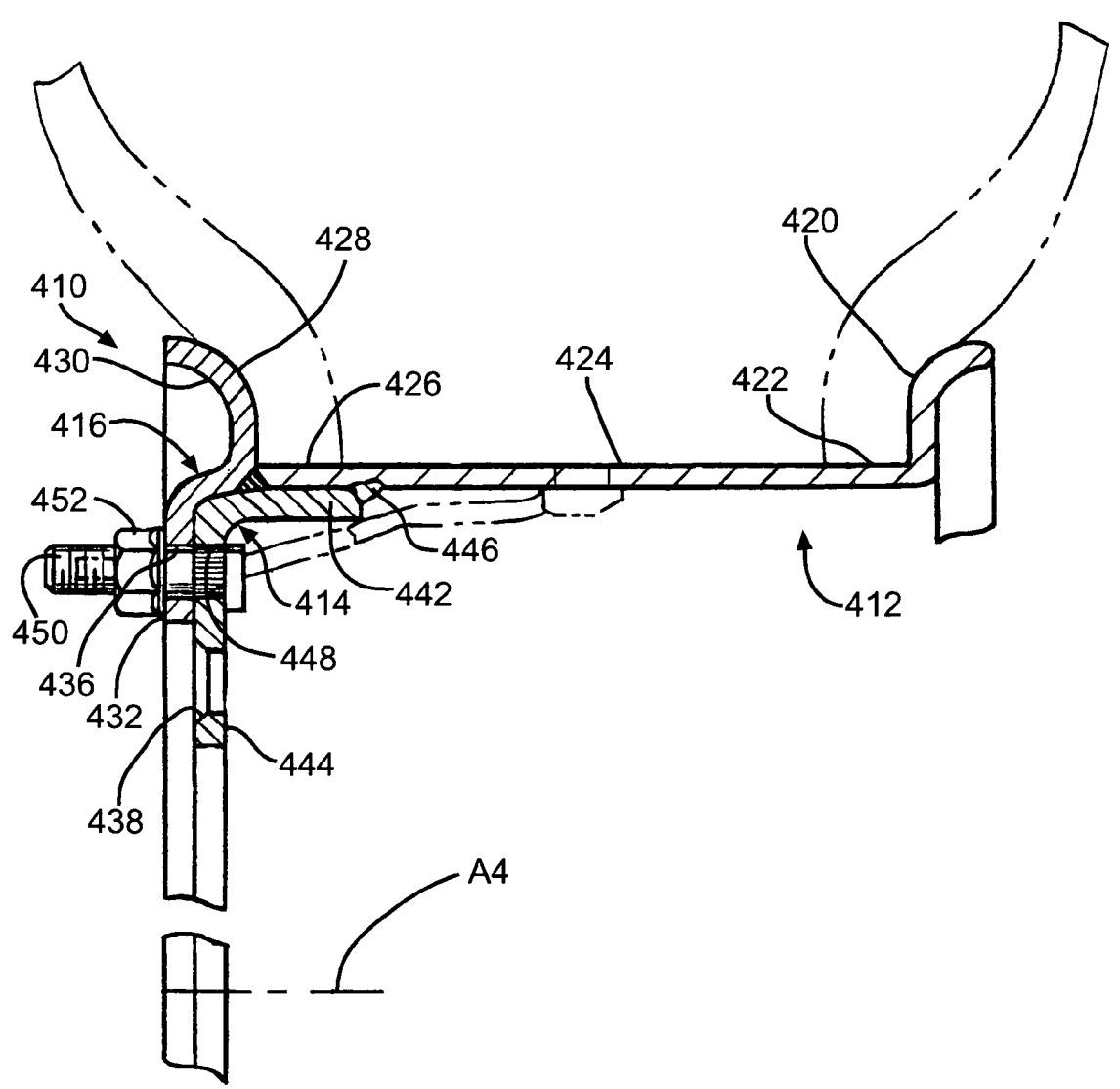
FIG. 9 is a sectional view of a portion of a third embodiment of the take apart vehicle wheel assembly in accordance with this invention.

Referring now to FIG. 9, there is illustrated a sectional view of a portion of a third embodiment of a take apart vehicle wheel assembly, indicated generally at 410, in accordance with this invention. FIG. 9 generally corresponds to FIG. 1 of U.S. Pat. No. 6,315,366 to Post et al. and only those portions of the vehicle wheel assembly necessary for understanding the present invention will be discussed in detail herein.

As shown therein, in this embodiment the take apart vehicle wheel assembly 410 includes an inner rim or first wheel part 412, a wheel mounting disc or second wheel part 414, and a combination outer rim-clamp ring or third wheel part 416. The inner rim 412 is fabricated from steel, aluminum, or other alloy materials and includes an inboard tire bead seat retaining flange 420, an inboard tire bead seat 422, a generally axially extending well 424, and an outboard tire bead seat 426.

The outer rim-clamp ring 416 is fabricated from steel, aluminum, magnesium, titanium, or other alloy materials and includes an outer annular flange 430 and an inner mounting surface 432. The outer annular flange 430 of the outer rim-clamp ring 416 defines an outboard tire bead seat retaining flange 428 of the wheel assembly 410. The inner mounting surface 432 includes a plurality of stud receiving holes 436 formed therein. In particular, in the illustrated embodiment of the take apart vehicle wheel assembly 410, twenty four stud receiving holes 436 are preferably formed in the inner mounting surface 432 (only one of such stud receiving holes 436 being illustrated in FIG. 9).

In the illustrated embodiment, the stud receiving holes 436 are spaced circumferentially around the inner mounting surface 432 in a unique unevenly spaced circumferential pattern or arrangement (i.e., not the same spacing between each adjacent stud receiving holes 436), for a purpose to be discussed below. The circumferential pattern includes twelve pairs or tandem groupings of stud receiving holes 436 which are spaced apart in a manner similar to that of the stud receiving holes 136 disclosed in connection with the embodiment of the take apart vehicle wheel assembly 110 illustrated in FIGS. 3-4. Alternatively, the take apart vehicle wheel assembly 410 can include twelve stud receiving holes 436 (i.e., six tandem groupings), arranged in a manner similar to that of the stud receiving holes 336 disclosed in connection with the embodiment of the take apart vehicle wheel assembly 310 illustrated in FIGS. 7-8, if so desired.

The wheel mounting disc 414 is forged, cast, fabricated, or otherwise formed from steel, aluminum, magnesium, titanium, or other alloy materials. The wheel mounting disc 414 includes a generally axially extending first portion 442, a generally radially extending second portion 444, and defines an axis A4. The first portion 442 defines an outer cylindrical surface which is connected to the well 424 of the inner rim 412 by a weld 446.

The second portion 444 is provided with a plurality of stud receiving holes 448 formed therein. The number and spacing of the stud receiving holes 448 provided in the second portion 444 of the wheel mounting disc 416 corresponds to the number and spacing of the stud receiving holes 436 provided in the inner mounting surface 432 of the outer rim-clamp ring 416. Thus, in the illustrated embodiment there are twelve groupings of stud receiving holes 448 (or alternatively six groupings of stud receiving holes 448), spaced in the same manner as that described above in connection with the stud receiving holes 436 of the outer rim-clamp ring 416. The stud receiving holes 436 and 448 of the outer rim-clamp ring 416 and the wheel mounting disc 414, respectively, receive stud bolts 450 and nuts 452 to secure the wheel mounting disc 414, and therefore the inner rim 412, to the outer rim-clamp ring 416.

The second portion 444 of the wheel mounting disc 414 further includes a plurality of wheel mounting stud receiving holes 438 formed therethrough. In particular, eight wheel mounting stud receiving holes 438 are formed in the second portion 444 (only one of such wheel mounting stud receiving holes 438 being illustrated in FIG. 9). The wheel mounting stud receiving holes 438 are adapted to receive lug bolts and nuts (not shown) for securing the take apart vehicle wheel assembly 410 on an axle (not shown) of a vehicle. Alternatively, the number and/or spacing of the wheel mounting stud receiving holes 438 may be other than illustrated if so desired.

Figure 10:
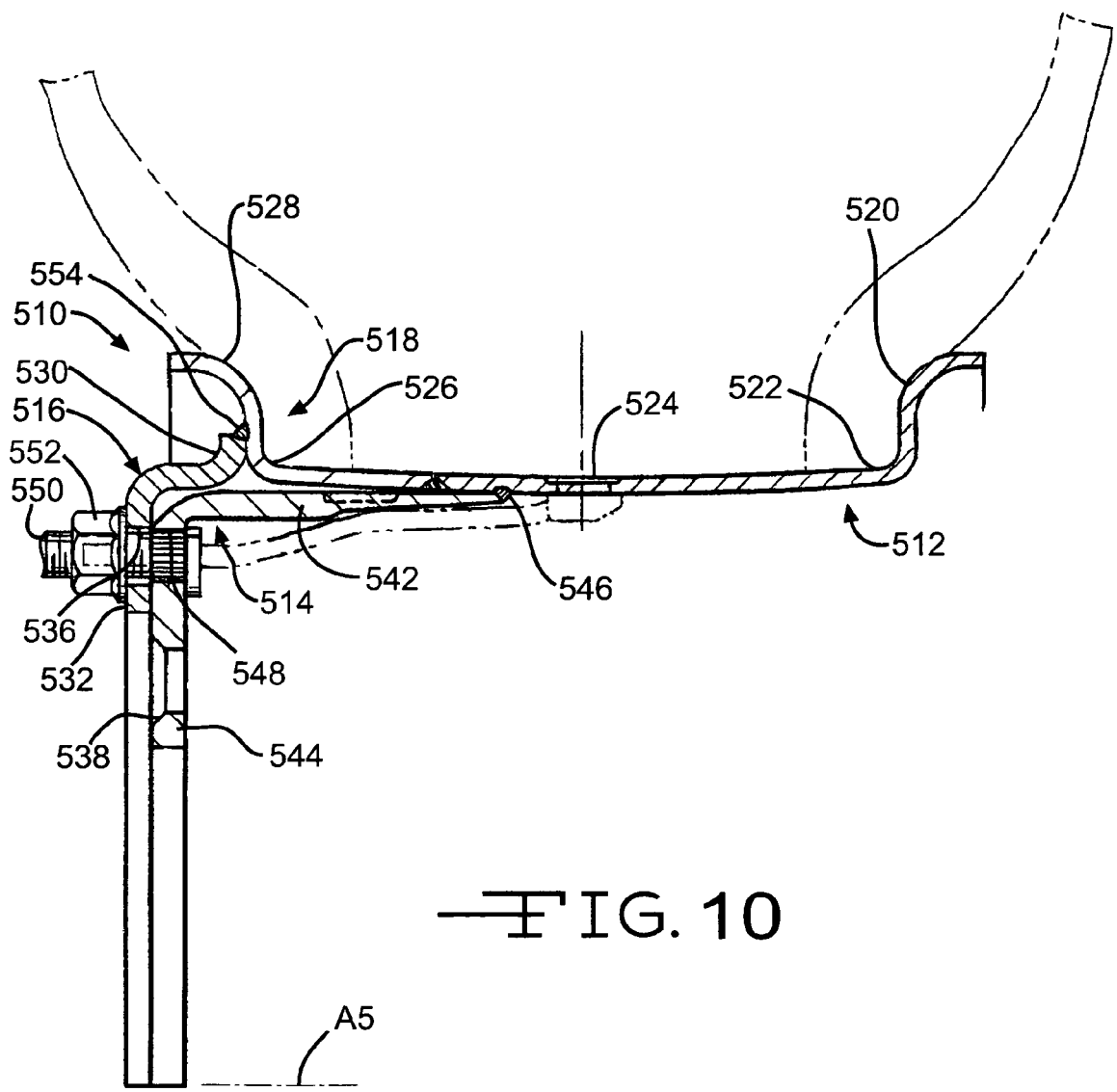
FIG. 10 is a sectional view of a portion of a fourth embodiment of the take apart vehicle wheel assembly in accordance with this invention.

Referring now to FIG. 10, there is illustrated a sectional view of a portion of a fourth embodiment of a take apart vehicle wheel assembly, indicated generally at 510, in accordance with this invention. FIG. 10 generally corresponds to FIG. 6 of U.S. Pat. No. 6,315,366 to Post et al. and only those portions of the vehicle wheel assembly necessary for understanding the present invention will be discussed in detail herein.

As shown therein, in the illustrated embodiment the take apart vehicle wheel assembly 510 includes an inner rim or first wheel part 512, an outer rim or second wheel part 518, a wheel mounting disc or third wheel part 514, and an outer clamp ring or fourth wheel part 516. The inner rim 512 and the outer rim 518 are fabricated from steel, aluminum, or other alloy materials. The inner rim 512 includes an inboard tire bead seat retaining flange 520, an inboard tire bead seat 522, and defines a portion of a generally axially extending well 524. The outer rim 518 also defines a portion of the well 524 and further includes an outboard tire bead seat 526 and an outboard tire bead seat retaining flange 528.

The clamp ring 516 is fabricated from steel, aluminum, magnesium, titanium, or other alloy materials and includes an outer annular flange 530 and an inner mounting surface 532. The outer annular flange 530 of the clamp ring 516 is secured to the outer rim 518 by a weld 554. The inner mounting surface 532 includes a plurality of stud receiving holes 536 formed therein. In particular, in the illustrated embodiment of the take apart vehicle wheel assembly 510, preferably twenty four stud receiving holes 536 are formed in the inner mounting surface 532 (only one of such stud receiving holes 536 being illustrated in FIG. 10).

In the illustrated embodiment, the stud receiving holes 536 are spaced circumferentially around the inner mounting surface 532 in a unique unevenly spaced circumferential pattern or arrangement (i.e., not the same spacing between each adjacent stud receiving holes 536), for a purpose to be discussed below. The circumferential pattern includes twelve pairs or tandem groupings of stud receiving holes 536 which are spaced apart in a manner similar to that of the stud receiving holes 136 disclosed in connection with the embodiment of the take apart vehicle wheel assembly 110 illustrated in FIGS. 3-4. Alternatively, the take apart vehicle wheel assembly 510 can include twelve stud receiving holes 536 (i.e., six tandem groupings), arranged in a manner similar to that of the stud receiving holes 336 disclosed in connection with the embodiment of the take apart vehicle wheel assembly 310 illustrated in FIGS. 7-8, if so desired.

The wheel mounting disc 514 is forged, cast, fabricated, or otherwise formed from steel, aluminum, magnesium, titanium, or other alloy materials. The wheel mounting disc 514 includes a generally axially extending first portion 542, a generally radially extending second portion 544, and defines an axis A5. The first portion 542 defines an outer cylindrical surface which is connected to the well 524 of the inner rim 512 by a weld 546.

The second portion 544 is provided with a plurality of stud receiving holes 548 formed therein. The number and spacing of the stud receiving holes 548 provided in the second portion 544 of the wheel mounting disc 516 corresponds to the number and spacing of the stud receiving holes 536 provided in the inner mounting surface 532 of the outer clamp ring 514. Thus, there are twelve groupings of stud receiving holes 548 (or alternatively six groupings of stud receiving holes 548), spaced in the same manner as that described above in connection with the stud receiving holes 536 of the outer clamp ring 516. The stud receiving holes 536 and 548 of the outer clamp ring 516 and the wheel mounting disc 514, respectively, receive stud bolts 550 and nuts 552 to secure the wheel mounting disc 514, and therefore the inner rim 512, to the outer clamp ring 516, and therefore the outer rim 518.

The second portion 544 of the wheel mounting disc 516 further includes a plurality of wheel mounting stud receiving holes 538 formed therethrough. In particular, eight wheel mounting stud receiving holes 538 are formed in the second portion 544 (only one of such wheel mounting stud receiving holes 538 being illustrated in FIG. 10). The wheel mounting stud receiving holes 538 are adapted to receive lug bolts and nuts (not shown) for securing the take apart vehicle wheel assembly 510 on an axle (not shown) of a vehicle. Alternatively, the number and/or spacing of the wheel mounting stud receiving holes 538 may be other than illustrated if so desired.

Figure 11:
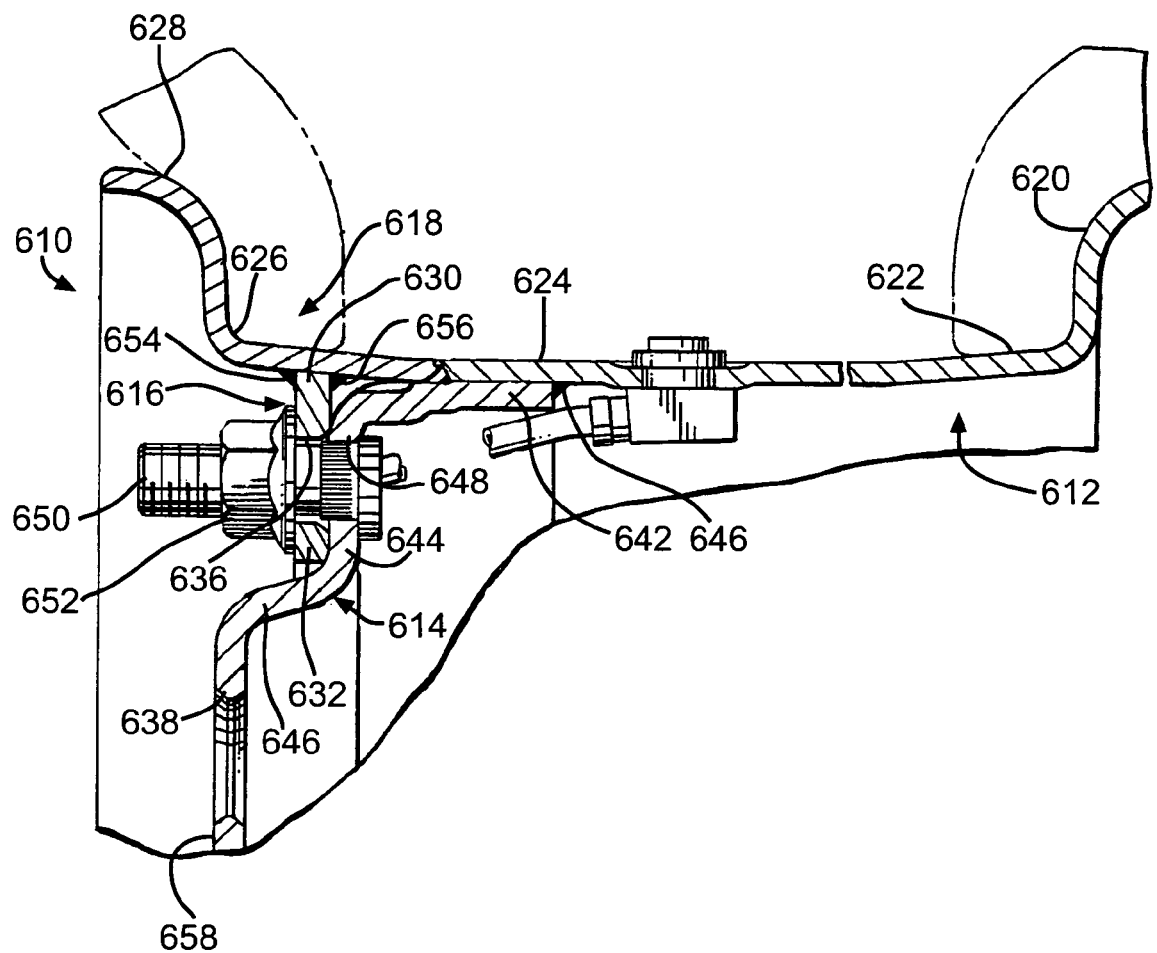
FIG. 11 is a sectional view of a portion of a fifth embodiment of the take apart vehicle wheel assembly in accordance with this invention.

Referring now to FIG. 11, there is illustrated a sectional view of a portion of a fifth embodiment of a take apart vehicle wheel assembly, indicated generally at 610, in accordance with this invention. FIG. 11 generally corresponds to FIG. 2 of U.S. Pat. No. 4,836,261 to Weeks et al. and only those portions of the vehicle wheel assembly necessary for understanding the present invention will be discussed in detail herein.

As shown therein, in the illustrated embodiment the take apart vehicle wheel assembly 610 includes an inner rim or first wheel part 612, an outer rim or second wheel part 618, a wheel mounting disc or third wheel part 614, and an outer clamp ring or fourth wheel part 616. The inner rim 612 and the outer rim 618 are fabricated from steel, aluminum, or other alloy materials. The inner rim 612 includes an inboard tire bead seat retaining flange 620, an inboard tire bead seat 622, and defines a portion of a generally axially extending well 624. The outer rim 618 also defines a portion of the well 624 and further includes an outboard tire bead seat 626 and an outboard tire bead seat retaining flange 628.

The clamp ring 616 is fabricated from steel, aluminum, magnesium, titanium, or other alloy materials and includes an outer portion 630 and an inner mounting portion or surface 632. The outer portion 630 of the clamp ring 614 is secured to the outer rim 618 by a pair of welds 654 and 656. The inner mounting portion 632 includes a plurality of stud receiving holes 636 formed therein. In particular, in the illustrated embodiment of the take apart vehicle wheel assembly 610, preferably twenty four stud receiving holes 636 are formed in the inner mounting portion 632 (only one of such stud receiving holes 636 being illustrated in FIG. 11).

In the illustrated embodiment, the stud receiving holes 636 are spaced circumferentially around the inner mounting portion 632 in a unique unevenly spaced circumferential pattern or arrangement (i.e., not the same spacing between each adjacent stud receiving hole 636), for a purpose to be discussed below. The circumferential pattern includes twelve pairs or tandem groupings of stud receiving holes 636 which are spaced apart in a manner similar to that of the stud receiving holes 136 disclosed in connection with the embodiment of the take apart vehicle wheel assembly 110 illustrated in FIGS. 3-4. Alternatively, the take apart vehicle wheel assembly 610 can include twelve stud receiving holes 636 (i.e., six tandem groupings), arranged in a manner similar to that of the stud receiving holes 336 disclosed in connection with the embodiment of the wheel assembly 310 illustrated in FIGS. 7-8, if so desired.

The wheel mounting disc 614 is forged, cast, fabricated, or otherwise formed from steel, aluminum, magnesium, titanium, or other alloy materials. The wheel mounting disc 614 includes a generally axially extending first portion 642, a generally radially extending second portion 644, a generally axially extending third portion 646, a generally radially extending fourth portion 658, and defines an axis. The first portion 642 defines an outer cylindrical surface which is connected to the well 624 of the inner rim 612 by a weld 646.

The second portion 644 is provided with a plurality of stud receiving holes 648 formed therein. The number and spacing of the stud receiving holes 648 provided in the second portion 644 of the wheel mounting disc 616 corresponds to the number and spacing of the stud receiving holes 636 provided in the inner mounting portion 632 of the outer clamp ring 616. Thus, there are twelve groupings of stud receiving holes 648 (or alternatively six groupings of stud receiving holes 648), spaced in the same manner as that described above in connection with the stud receiving holes 636 of the outer clamp ring 616. The stud receiving holes 636 and 648 of the outer clamp ring 616 and the wheel mounting disc 614, respectively, receive stud bolts 650 and nuts 652 to secure the wheel mounting disc 614, and therefore the inner rim 612, to the outer clamp ring 616, and therefore the outer rim 618.

The fourth portion 658 of the wheel mounting disc 614 further includes a plurality of wheel mounting stud receiving holes 638 formed therethrough. In particular, eight wheel mounting stud receiving holes 638 are formed in the fourth portion 658 (only one of such wheel mounting stud receiving holes 638 being illustrated in FIG. 11). The wheel mounting stud receiving holes 638 are adapted to receive lug bolts and nuts (not shown) for securing the take apart vehicle wheel assembly 610 on an axle (not shown) of a vehicle. Alternatively, the number and/or spacing of the wheel mounting stud receiving holes 638 may be other than illustrated if so desired.

One advantage of the invention relates to interchangeability reasons due to the unique tandem spacing of the stud receiving holes 136 and 148, 436 and 448, 536 and 548, and 636 and 648 provided in the associated components of the take apart vehicle wheel assemblies 110, 410, 510 and 610, respectively, of the present invention. For example, with respect to the embodiment of the take apart wheel assembly shown in FIGS. 3-4, due to the unique tandem spacing of the stud receiving holes 136 and 148 of the take apart vehicle wheel assembly 110, the outer rim-wheel mounting disc 14 of the prior art take apart vehicle wheel assembly 10 shown in prior art FIGS. 1 and 2 cannot be secured to the clamp ring 116 and inner rim 112 of the take apart vehicle wheel assembly 110 of the present invention. This is because none of the stud receiving holes 36 in the prior art outer rim-wheel mounting disc 14, which are evenly spaced apart from each other by fifteen degrees, would be in alignment with the stud receiving holes 148 provided in the clamp ring 116, which are spaced apart from each other in an unevenly spaced circumferential pattern, i.e., A1 and A2. Such preventing of interchangeability would be important in the case where the take apart vehicle wheel assembly 110 of the present invention has a higher vehicle load rating than the prior art take apart vehicle wheel assembly 10.

In addition, for example, with respect to the embodiment of the take apart vehicle wheel assembly 110 shown in FIGS. 3-4, for interchangeability reasons, if necessary the outer rim-wheel mounting disc 114 of the take apart vehicle wheel assembly 110 of the present invention can be installed on the prior art take apart vehicle wheel assembly 210 having the twelve evenly spaced stud receiving holes thirty degrees apart from one another. This is because the outer rim-wheel mounting disc 114 of the take apart vehicle wheel assembly 110 would include twelve stud receiving holes spaced thirty degrees apart from one another. Such allowance of interchangeability would apply in the case where the vehicle load rating of the prior art take apart vehicle wheel assembly 210 is not greater than of the take apart vehicle wheel assembly 110 of the present invention.

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A take apart vehicle wheel assembly comprising:
at least a first, a second and a third wheel part operatively connected together to form the take apart vehicle wheel assembly, wherein a first one of said first, second and third wheel parts is provided with a plurality of first stud receiving holes spaced circumferentially therearound in a first unevenly spaced circumferential pattern such that each of said first stud receiving holes is spaced apart from a next adjacent first stud receiving hole by a different angular spacing and wherein a second one of said first, second and third wheel parts is provided with a plurality of second stud receiving holes spaced circumferentially therearound in unevenly spaced circumferential pattern which corresponds to said first unevenly spaced circumferential pattern of said first stud receiving holes to enable stud bolts and nuts to be used to releasably connect said first one and said second one of said first, second and third wheel parts together;
wherein said first stud receiving holes includes only twelve tandem groupings of stud receiving holes and said second stud receiving holes includes only twelve tandem groupings of stud receiving holes;
wherein said first and second stud receiving holes of each of said only twelve tandem groupings are spaced apart from each other by a first angle and adjacent ones of said first and second stud receiving holes of adjacent ones of said only twelve tandem groupings are spaced apart from each other by a second angle; and wherein said first angle is in the range from about ten degrees to about fourteen degrees, said second angle is in the range from about twenty degrees to about sixteen degrees, and said first angle and said second angle combined equals thirty degrees.

2. The take apart vehicle wheel assembly of Claim 1 wherein said first angle is approximately twelve and one-half degrees and said second angle is approximately seventeen and one-half degrees.

3. The take apart vehicle wheel assembly of claim 1 wherein said first wheel part is an inner rim, said second wheel part is an outer rim-wheel mounting disc, and said third wheel part is a clamp ring, and wherein said first stud receiving holes are provided in said outer rim-wheel mounting disc and said second stud receiving holes are provided in said clamp ring.

4. The take apart vehicle wheel assembly of claim 1 wherein said first wheel part is an inner rim, said second wheel part is a wheel mounting disc, and said third wheel part is an outer rim-clamp ring, and wherein said first stud receiving holes are provided in said outer rim-clamp ring and said second stud receiving holes are provided in said wheel mounting disc.

5. The take apart vehicle wheel assembly of claim 1 wherein said wheel assembly includes four wheel parts, wherein said first wheel part is an inner rim, said second wheel part is an outer rim, said third wheel part is a wheel mounting disc, and said fourth wheel part is an outer clamp ring, and wherein said first stud receiving holes are provided in said outer clamp ring and said second stud receiving holes are provided in said wheel mounting disc.

6. A take apart vehicle wheel assembly comprising:
a first wheel part which defines at least a portion of an inner rim of the take apart vehicle wheel assembly;
a second wheel part joined to said first wheel part by a weld, said second wheel part provided with a plurality of first stud receiving holes formed therein; and
a third wheel part operatively connected to at least said second wheel part by a plurality of stud bolts and nuts, said third wheel part is provided with a plurality of second stud receiving holes formed therein;
wherein said first stud receiving holes are spaced circumferentially around said second wheel part in a first unevenly spaced circumferential pattern such that each of said first stud receiving holes is spaced apart from a next adjacent first stud receiving hole by a different angular spacing and said second stud receiving holes are spaced circumferentially around said third wheel part in unevenly spaced circumferential pattern which corresponds to said first unevenly spaced circumferential pattern of said first stud receiving holes of said second wheel part to enable said stud bolts and nuts to be used to releasably connect said second wheel part and said third wheel part together;
wherein said first stud receiving holes includes only twelve tandem groupings of stud receiving holes and said second stud receiving holes includes only twelve tandem groupings of stud receiving holes;
wherein said first and second stud receiving holes of each of said only twelve tandem groupings are spaced apart from each other by a first angle and adjacent ones of said first and second stud receiving holes of adjacent ones of said only twelve tandem groupings are spaced apart from each other by a second angle; and
wherein said first angle is in the range from about ten degrees to about fourteen degrees, said second angle is in the range from about twenty degrees to about sixteen degrees, and said first angle and said second angle combined equals thirty degrees.

7. The take apart vehicle wheel assembly of claim 6 wherein said first wheel part is an inner rim, said second wheel part is an outer rim-wheel mounting disc, and said third wheel part is a clamp ring, and wherein said first stud receiving holes are provided in said outer rim-wheel mounting disc and said second stud receiving holes are provided in said clamp ring.

8. The take apart vehicle wheel assembly of claim 6 wherein said first wheel part is an inner rim, said second wheel part is a wheel mounting disc, and said third wheel part is an outer rim-clamp ring, and wherein said first stud receiving holes are provided in said outer rim-clamp ring and said second stud receiving holes are provided in said wheel mounting disc.

9. The take apart vehicle wheel assembly of claim 6 wherein said wheel assembly includes four wheel parts, wherein said first wheel part is an inner rim, said second wheel part is an outer rim, said third wheel part is a wheel mounting disc, and said fourth wheel part is an outer clamp ring, and wherein said first stud receiving holes are provided in said outer clamp ring and said second stud receiving holes are provided in said wheel mounting disc.

* * * * *